United States Patent [19]

Kurelek

[11] 3,709,267

[45] Jan. 9, 1973

[54] LOG HANDLING MECHANISM FOR TREE HARVESTERS

[75] Inventor: John Kurelek, Brantford, Ontario, Canada

[73] Assignee: Koehring-Waterous, Ltd., Brantford, Ontario, Canada

[22] Filed: Aug. 27, 1969

[21] Appl. No.: 853,455

[52] U.S. Cl..................144/2 Z, 144/3 D, 144/246 C
[51] Int. Cl. ...............................................A01g 23/08
[58] Field of Search......144/208 R, 242 R, 2 Z, 34 E, 144/309 AC, 34 R, 3 D, 246 C, 246 F

[56] References Cited

UNITED STATES PATENTS

| | | | |
|---|---|---|---|
| 1,531,367 | 3/1925 | Ahrens | 144/246 C |
| 3,068,918 | 12/1962 | Smith | 144/246 C |
| 3,140,736 | 7/1964 | Propst | 144/3 D |
| 3,269,436 | 8/1966 | Moore | 144/3 D |
| 3,443,611 | 5/1969 | Jorgensen | 144/309 AC |
| 3,516,462 | 6/1970 | Martinson et al | 144/3 D |

FOREIGN PATENTS OR APPLICATIONS 621,584   6/1961   Canada..................144/3 D Primary Examiner—Gerald A. Dost
Attorney—William A. Denny, John F. Friedl and Wenzel Zierold

[57] ABSTRACT

A pair of conical log impellers are mounted upright on the chassis of a tree harvesting machine at a fixed transverse spacing from each other and driven synchronously in opposite directions. A log dropped sidewise into the V-shaped gap between the impellers and bearing thereon at its opposite sides not only tends to advance lengthwise in a generally horizontal direction but also tends to adjust itself into alinement with a vertical plane bisecting the V-shaped gap.

7 Claims, 6 Drawing Figures

PATENTED JAN 9 1973

INVENTOR.
JOHN KURELEK
BY W. A. Denny
ATTORNEY.

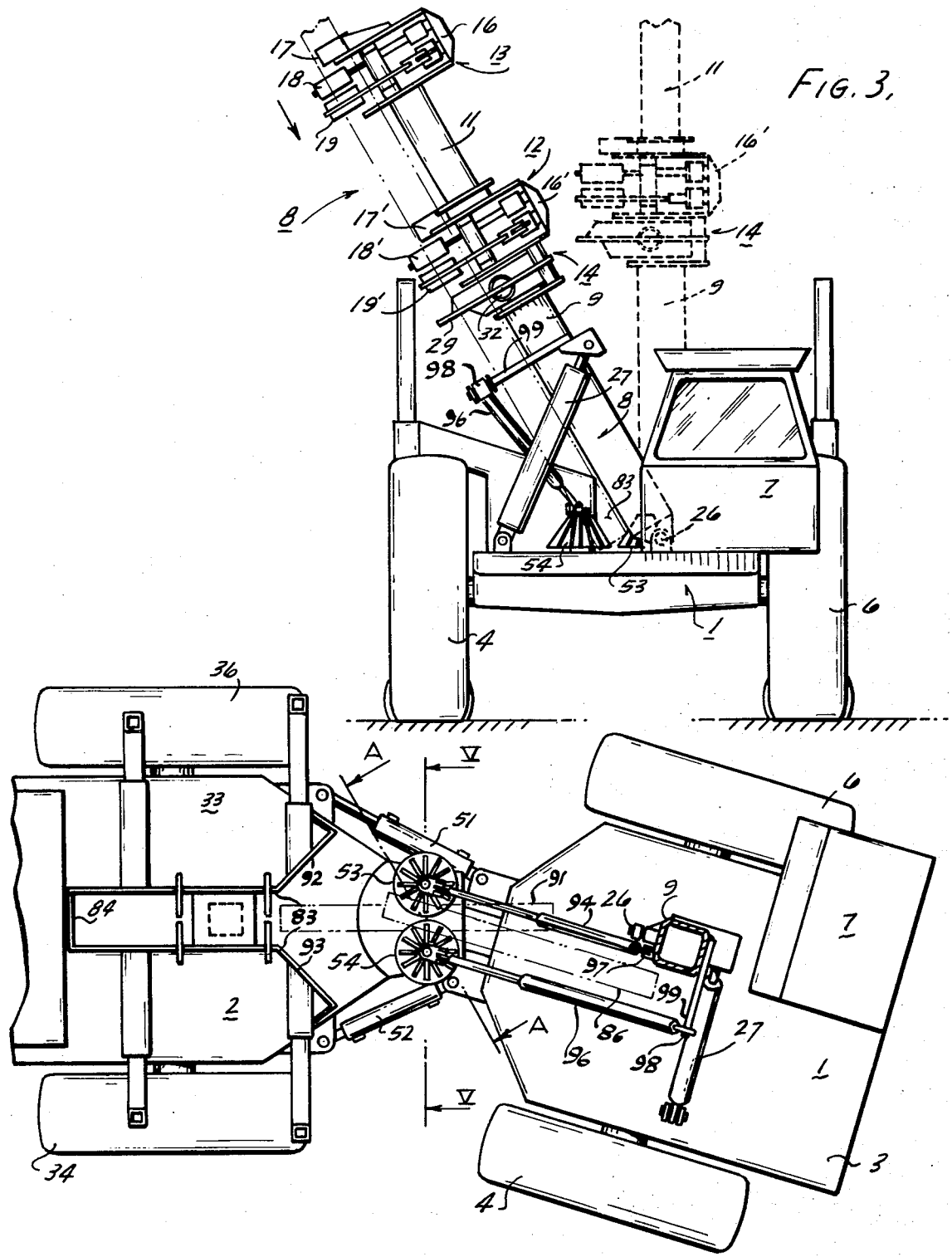

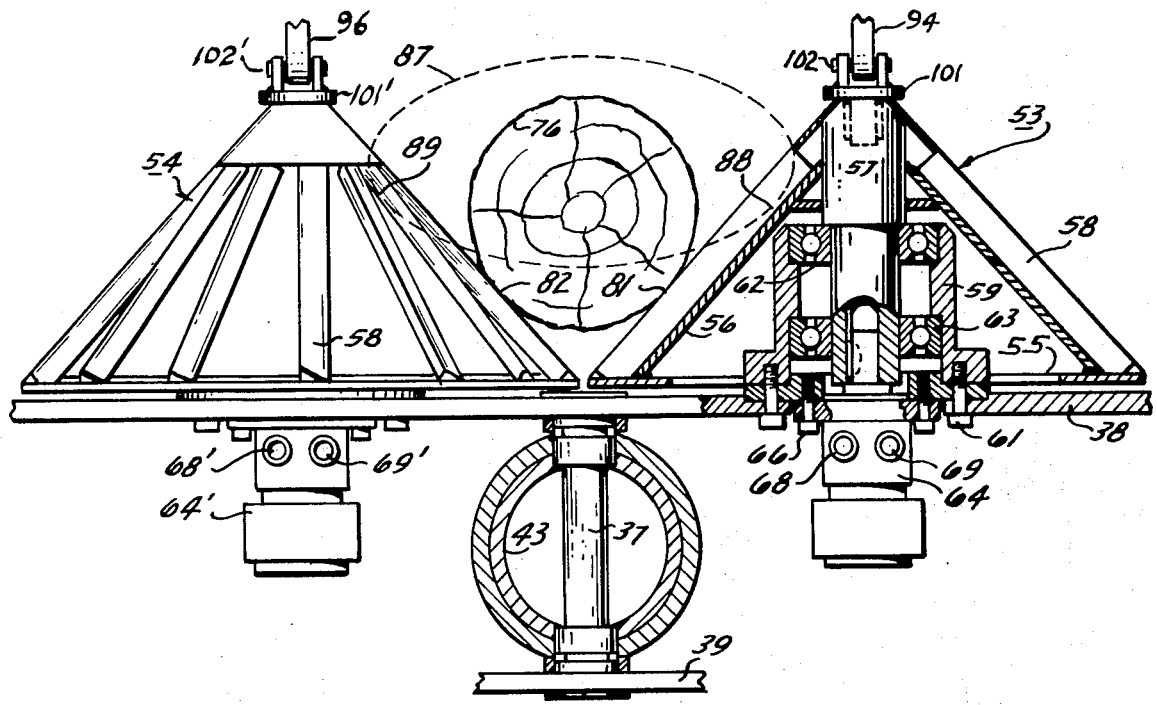
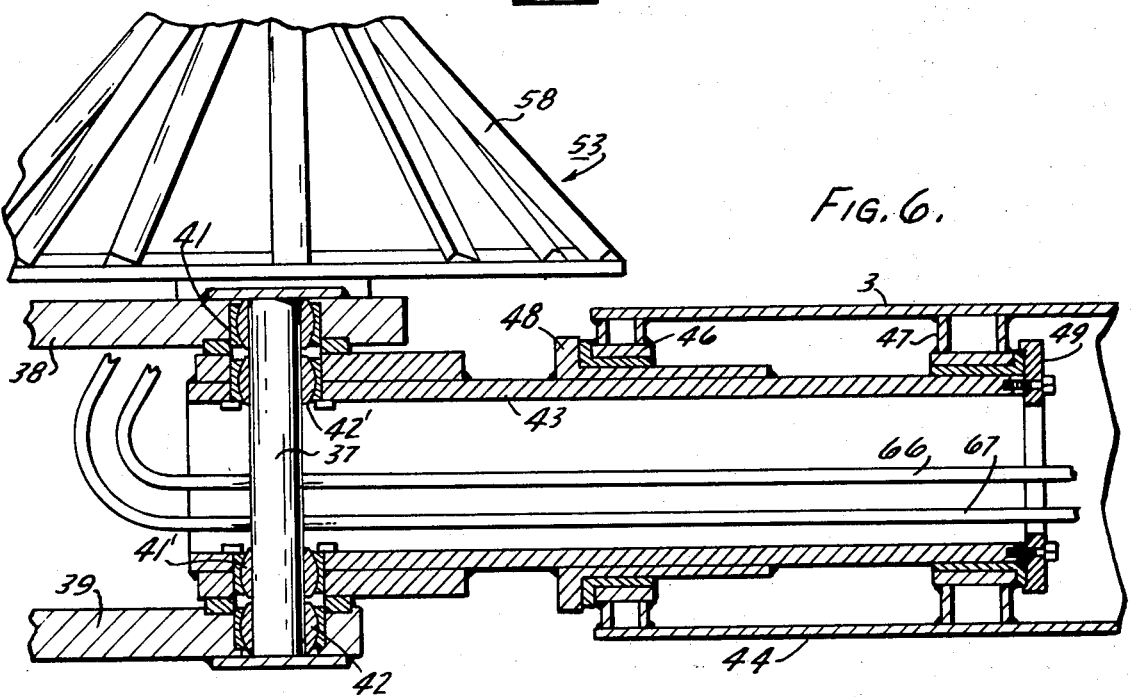

LOG HANDLING MECHANISM FOR TREE HARVESTERS

The invention relates to the harvesting of trees, and it is concerned more particularly with the handling of logs in a tree harvesting apparatus.

Tree harvesting apparatus have heretofore been known wherein a tree processing tower is mounted on the forward section of an articulated vehicle chassis, and wherein a storage receptacle for cut and delimbed logs is mounted on the rearward section of the vehicle chassis.

One of the problems which are encountered with such tower type tree harvesting apparatus is the transfer of logs from the front to the rear vehicle unit, which involves downward angular displacement as well as endwise rearward displacement of successive logs.

Another problem encountered with such apparatus is the straightening of the logs which becomes necessary under certain operating conditions. For proper storage of the cut logs on the rear vehicle unit the logs should be positioned lengthwise in the longitudinal direction of the rear chassis section. This makes it necessary, when the front and rear chassis sections are horizontally angled, as for steering, to change the direction in which the cut log is delivered from the front chassis section so that it will be presented in longitudinal alignment with the rear chassis section for proper storage on the latter.

Generally, it is an object of the present invention to provide an improved mechanism for handling logs in a tree harvesting apparatus.

More specifically, it is an object of the invention to provide improved log handling equipment for a tower type tree harvesting apparatus, which will take care of the log transfer from the tower to a storage area on the apparatus in an expeditious and reliable manner under all operating conditions.

A further object of the invention is to provide an improved log impelling mechanism for a tree harvesting apparatus of the articulated vehicle type, which will advance a log endwise in a generally horizontal direction from the forward to the rearward chassis section, and which will automatically swing the log sidewise into longitudinal alignment with the rearward chassis section when the latter is out of longitudinal alignment with the forward chassis section.

A further object of the invention is to provide an improved log impelling mechanism of the above mentioned character which is of utmost mechanical and structural simplicity.

These and other objects and advantages are attained by the present invention, various novel features of which will be apparent from the description herein and the accompanying drawings of a preferred embodiment of the invention.

In the drawings:

FIG. 3 is a front view of the apparatus shown in FIG. 1, looking in the direction of arrow III and showing a processing tower in full lines adjusted in a leaned position;

FIG. 4 is a view similar to FIG. 2 but showing the apparatus in a horizontally angled condition for steering; parts being broken away and shown in section on line IV—IV of FIG. 1;

FIG. 5 is an enlarged sectional detail view on line V—V of FIG. 2; and

FIG. 6 is an enlarged sectional detail view on line VI—VI of FIG. 2.

Figure 1:
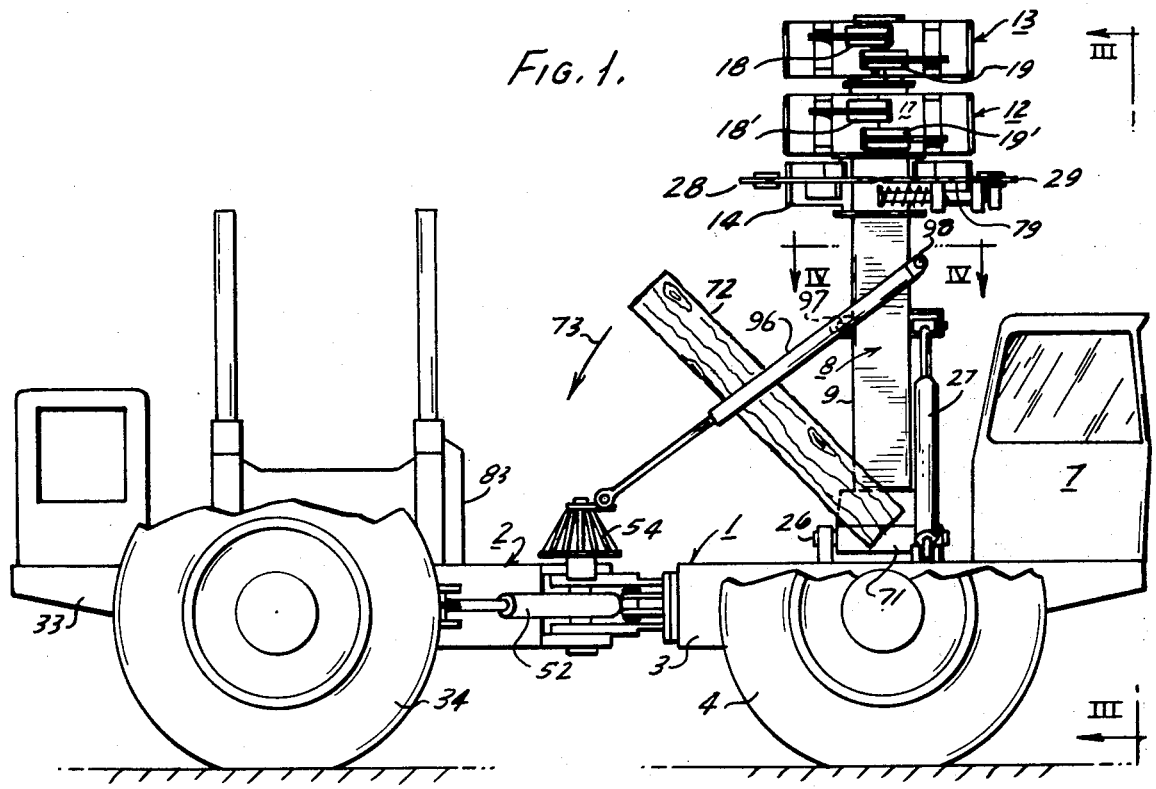
FIG. 1 is a side elevation of a tree harvesting apparatus embodying the invention.
Figure 2:
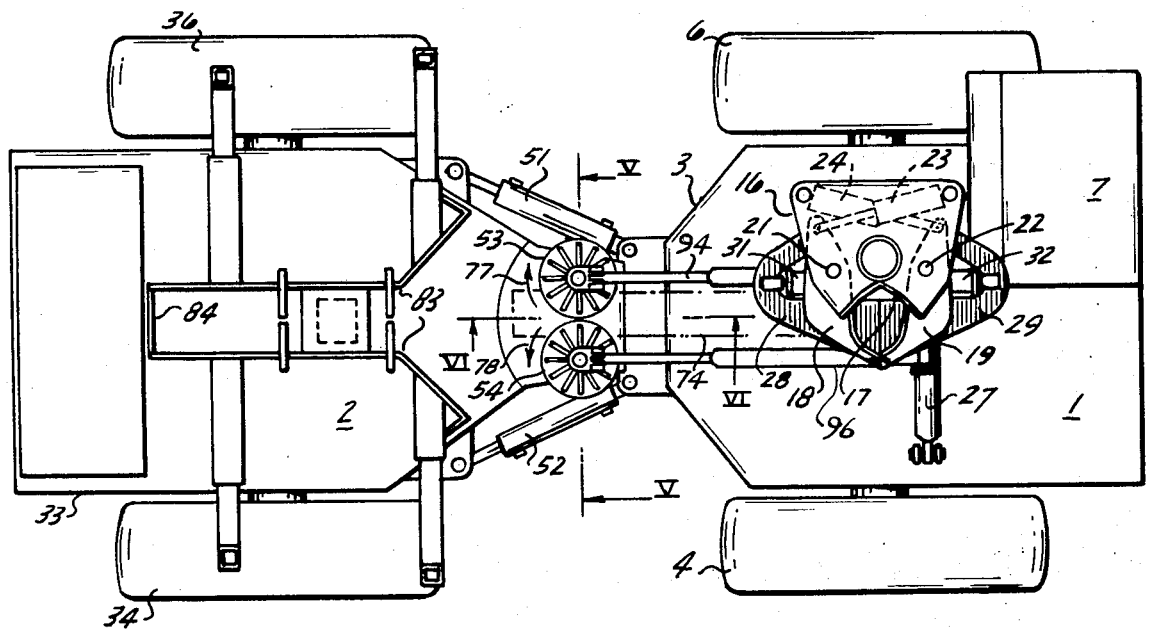
FIG. 2 is a top view of the apparatus shown in FIG. 1.

Generally the apparatus shown in FIGS. 1 and 2 represents an articulated, self-propelled vehicle having a front unit 1 and a rear unit 2.

The front vehicle unit has a chassis frame 3 which is supported on rubber tired, power driven wheels 4 and 6. An operator's cab 7 is mounted at the forward left corner of the frame 3, and a tree processing tower, generally designated by the reference character 8 is mounted midships on the frame 3 between the wheels 4 and 6.

The processing tower 8, as such, is not part of the present invention. It is disclosed herein as a representative form of log producing equipment which may be used in a tree harvesting apparatus embodying the present invention.

Briefly, the processing tower 8 comprises a butt section 9 which, as shown in FIG. 4, is made of square tubing; a reciprocable section 11 (FIG. 3) which is telescopically mounted in the butt section 9; a tree holding clamp assembly 12 at the upper end of the butt section; a delimbing head 13 at the upper end of the reciprocable tower section; and a log shear assembly 14 on the butt section below the clamp assembly 12.

As shown in FIg. 2, a horizontal frame 16 of the delimbing head 13 mounts a vertical, generally arcuate face plate 17 which forms a tree seat at the processing side of the tower 8. Also mounted on the frame of the delimbing head are a pair of tree clasping arms 18 and 19 which are swingable horizontally back and forth on pivot centers 21 and 22. Hydraulic actuating rams 23 and 24 for the arms 18 and 19, respectively, are pivoted on the frame 16. When extended as shown in FIG. 2, the rams 23, 24 hold the arms 18 and 19 in a tree encircling position at the concave side of the face plate 17. Contraction of the rams 23, 24 swings the arms 18, 19 in opposite directions on their pivot centers 21, 22 so that the concave side of the face plate 17 will be cleared.

The tree holding clamp assembly 12 is constructed substantially like the delimbing head 13. In FIGS. 1 and 3 the same reference numerals which are applied to the parts of the delimbing head are primed to designate corresponding parts of the tree holding clamp assembly 12.

To prepare the tower for a processing cycle the delimbing head is lowered by a retracting stroke of the tower section 11, which places the delimbing head close to the upper side of the tree holding clamp 12 as shown in FIG. 1. The clasping arms 18, 19 of the delimbing head and the corresponding clasping arms 18', 19' of the holding clamp 12 are swung open to their tree accepting positions. A tree which has been cut at its base from the ground and raised to an elevated upright position by suitable equipment, not shown, may then be moved horizontally sidewise toward the processing side of the tower while the latter is kept in an upright position as shown in broken lines in FIG. 3. The trunk of the elevated upright tree may thus be engaged laterally at its lower end with the concave side of the face plate 17' of the open holding clamp 12, while another, somewhat higher trunk portion of the elevated tree may contact the concave side of the face plate 17 of the open delimbing head 13. The clasping arms 18', 19' of the holding clamp may then be swung with considerable clamping pressure against the lower end of the elevated tree trunk, and the latter will thus be locked to the tower butt section 9. The clasping arms 18, 19 of the delimbing head are also swung to their tree encircling positions as shown in FIG. 2 while the delimbing head is in its lowered position as shown in FIG. 1.

The face plate 17 and the clasping arms 18, 19 of the delimbing head have sharpened upper edges to act as delimbing knives during an up stroke of the reciprocable tower section. For such up stroke only a relatively light clamping pressure is applied to the clasping arms of the delimbing head so that the tree will be steadied during the up stroke and shoots, limbs and branches will be cut off at their junctures with the trunk by the cutting edges of the face plate 17 and of the clasping arms 18, 19.

The lower end of the tower butt section 9 has a pivotal connection 26 with the chassis of the front vehicle unit on a horizontal, fore and aft extending, axis. A double acting hydraulic ram 27 is connected at its opposite ends to the chassis and tower, and may be extended and contracted to adjust the tower to the broken and full line positions in which it is shown in FIG. 3. The leaned full line position of the tower is preferred for the actual delimbing operation because the slash which is produced by the upstroke of the delimbing head will then fall on the ground rather than accumulate on the front vehicle unit.

When the reciprocable tower section 11 has completed its up stroke and before it begins its down stroke the tree is locked to the delimbing head and unlocked from the tower butt section. This is accomplished by increasing the clamping pressure of the clasping arms 18, 19 and by decreasing the clamping pressure of the clasping arms 18', 19'. A subsequent down stroke of the tower section 11 will then present a delimbed trunk portion of desired log length at the processing side of the tower below the holding clamp assembly 12.

The log shear assembly 14 of the processing tower serves to cut a log of desired length, normally eight feet, from the delimbed trunk portion of the tree which has been lowered through the released holding clamp 12 by a down stroke of the reciprocable tower section 11. The shear assembly 14 comprises a pair of cutting arms 28, 29 which are mounted on the tower butt section 9 for horizontal swinging toward and away from each other below the tree holding clamp assembly 12. As shown in FIG. 2, actuating rams 31, 32 for the cutting arms 28, 29 may be contracted to force them together and thereby sever a log from the trunk of a tree held upright by the retracted delimbing head 13. To complete the processing of the remaining part of the tree, the described operating cycle of the tower and its associated mechanisms may be repeated as necessary.

The rear vehicle unit 2 has a chassis frame 33 which is supported, like the front vehicle unit 1, on rubber tired, power driven wheels 34 and 36. For steering purposes the front and rear vehicle units are connected in horizontally swingable, vertically rigid, and laterally rockable relation to each other by a center joint which is shown in detail in FIG. 6. A king pin 37 is mounted at its opposite ends in upper and lower platform portions 38, 39 of the rear chassis frame 33 by means of self-aligning ball bushings 41 and 42. In the space between the rear chassis portions 38, 39 the king pin 37 mounts one end of a large diameter, relatively long coupling sleeve 43 by means of self-aligning ball bushings 41' and 42'. The coupling sleeve 43 is rotatably connected with a box section part 44 of the front chassis frame 3 by axially spaced bearings 46 and 47. Stop collars 48, 49 on the coupling sleeve 43 retain the front frame 3 in axially fixed relation to the coupling sleeve.

As shown in FIGS. 2 and 4 horizontal angular displacement of the front and rear vehicle units about the axis of the king pin 37 for steering purposes is obtained in conventional manner by hydraulic rams 51 and 52.

To provide for the transfer of logs from the front vehicle unit to the rear vehicle unit a pair of log impelling members 53 and 54 are operatively mounted on the rear chassis frame 33 adjacent to its vertical pivot connection with the front chassis frame 3. As best shown in the enlarged view of FIG. 5 the impeller 53 comprises a plate metal cone 56, a plate metal base ring 55 welded to the wide end of the cone 56, an arbor 57 coaxial with the cone 56 and welded at its upper end to the apex of the latter, and a circumferential series of cleats 58 welded to the outside of the cone 56.

The arbor 57 is mounted for rotation on its axis in a bearing housing 59 which is secured to the platform portion 38 of the rear chassis by capscrews 61. A reduced portion of the arbor 57 is journaled in the bearing housing 59 by upper and lower ball bearings 62 and 63. Coupled to the lower end of the arbor 57 is a rotary hydraulic motor 64 which is bolted to the under side of the platform portion 38 by capscrews 66.

The impeller 54 is a duplicate of the impeller 53 and is driven by a hydraulic motor 64'. Flexible fluid conduits 66, 67 (FIG. 6) extending through the coupling sleeve 43 of the center joint are connected to fluid inlet and outlet ports 68, 69 of the fluid motor 64, and corresponding fluid conduits, not shown, are connected to the inlet and outlet ports of the fluid motor 64'.

It will be noted that each of the impellers 53, 54 has an axis of rotation and a body portion which is defined by a generatrix rotating about that axis which, in the illustrated embodiment of the invention, is the axis of the arbor 57. The bearing assembly 59, 62, 63 for the impeller 53, and the corresponding bearing assembly for the impeller 54, mount the impellers on the rear chassis in horizontally spaced relation and at opposite sides of a vertical plane which extends lengthwise of the rear vehicle unit through the axis of the king pin 37. The bearing assemblies for the impellers 53, 54 are angularly disposed relative to the rear chassis so as to present the peripheral surfaces of the impellers at their relatively adjacent sides in downwardly converging relation to each other. The purpose of this arrangement is to provide a V-shaped gap between the impellers for the reception of logs and their transfer from the front to the rear vehicle unit of the tree harvester.

In operation, logs are successively produced on the front vehicle unit by the tower 8 and its associated mechanisms as has been explained hereinbefore. As each log is severed from the tree trunk at the processing side of the tower by a cutting stroke of the shear assembly 14, its bottom end settles on a ledge 71 which projects laterally from the bottom end of the tower. At the same time the upper end of the log is given a kick in a rearward direction away from the tower by a spring pressed plunger assembly 72 which is mounted on the underside of the cutting arm 29 for swinging movement therewith relative to the cutting arm 28. The resulting backward fall of the log which is illustrated in FIG. 1 by the dotted log position 72 and arrow 73 brings the downwardly moving end of the log into the V-shaped gap between the conical log impellers 53 and 54. This is illustrated by the dotted log position 74 in FIG. 2 and by the dotted log position 76 in FIG. 5, assuming that the front and rear vehicle units 1 and 2 are longitudinally alined as shown in FIG. 2.

Throughout the entire harvesting operation the log impellers 53, 54 are continuously rotated by the fluid motors 64, 64' in opposite directions as indicated by the arrows 77, 78 in FIG. 2. When the log hits the cones it will be grabbed by the rotating cleats 58 of the cone 53 at one side and by the cleats 58 of the cone 54 at its other side at contact points 81, 82 which are transversely alined in the vertical plane of the section line V—V in FIG. 2. Depending on the diameter of the log the contact points 81, 82 will lie higher or lower within the V-shaped gap between the cones. Under the weight of the log which keeps it in contact with the cones, and under the peripheral forces of the cones which are transmitted to the log by the cleats 58 the log will be impelled lengthwise in a generally horizontal direction from the front vehicle unit 1 upon the rear vehicle unit 2. The angular velocities at which the cones 53, 54 rotate are equal and fairly high at the contact points between the log and the cones. Consequently under the assumed conditions, the log will be shot straight back into the entrance 83 of log storage equipment which is mounted on the rear vehicle chassis 33. Momentum of the log will bring its leading end against a stop plate 84 of the storage equipment.

Let is now be assumed that the front and rear vehicle units are horizontally angled relative to each other as shown in FIG. 4, and that a vertical log is severed from an upright tree on the tower by a cutting stroke of the shear assembly 14. In that case the log will again fall back from the tower in the longitudinal direction of the front vehicle unit, but it will be angularly displaced lengthwise with respect to the longitudinal direction of the rear vehicle unit 2, as indicated by the dotted log position 86 in FIG. 4. Accordingly when the leading end of the log falls into the V-shaped gap between the cones 53, 54 it will extend obliquely to the vertical plane of section line V—V in FIG. 4. In that position the periphery of the log will contact the cleats of the cone 53 in rear of the plane V—V, and it will contact the cleats of the cone 54 in front of the plane V—V. The line A—A in FIG. 4 indicates a vertical plane through the rearward and forward contact points of the obliquely positioned log with the cones 53 and 54. The intersection of the plane A—A with the obliquely positioned log 86 forms the ellipse 87 shown in FIG. 5. At point 88 of the ellipse the obliquely positioned log 86 contacts the cone 53 in rear of the plane V—V, and at point 89 of the ellipse the obliquely positioned log 86 contacts the cone 54 in front of the plane V—V. The contact points 88, 89 of the obliquely positioned log are elevated with respect to the contact points 81, 82 of the squarely positioned log 74 of FIG. 2. While the cones 53, 54 are rotating at equal speeds the direction of arrows 77, 78, respectively, and the log advances lengthwise through the V-shaped gap in a generally rearward direction, it tends to drift downward under its own weight. During such downward movement of the log the contact points 88, 89 also shift downward toward the contact points 81, 82 respectively. Coincident with the downward shift of the contact points 88, 89 the angle of the log with respect to the plane V—V gradually changes from the inclined relation in log position 86 to squared or right angle relation as indicated by log position 91 in FIG. 4. In this manner the rearwardly moving log will be automatically aligned lengthwise with the longitudinal direction of the rear vehicle unit while the vehicle units are horizontally angled relative to each other as shown in FIG. 4.

The hereinabove described self-straightening action of the log takes place in an analogous manner when the front vehicle unit is angled to the left with respect to the rear vehicle unit 2, rather than to the right as shown in FIG. 4.

From the log position 91 in FIG. 4 the log is shot by its momentum rearwardly into the entrance 83 of the log storage equipment. Rearwardly converging log guiding baffles 92, 93 are mounted on the rear chassis 33 to assist the impelling cones 53, 54 in directing logs into the entrance 83.

As previously mentioned, the tower is preferably adjusted to the leaned position of FIG. 3 for the delimbing operation. When the shear assembly 14 is actuated to sever a log from a tree held by the clamp assembly 12 or by the lowered delimbing head 13 while the tower is in a leaned position, the leading end of the rearwardly falling log may miss landing in the V-shaped gap between the conical impellers 53, 54. In order to avoid such aberration of the falling log a pair of laterally spaced telescopic guide rails, 94 and 96, are connected with the tower and with the impellers as shown in FIGS. 1 to 4. A universal joint 97 connects the tubular section of the guide rail 94 with an upper portion of the tower butt section 9, and another universal joint 98 connects the tubular section of the rail 96 with a side arm 99, (FIG. 3), of the butt section 9. A swivel block 101 (FIG. 5) is rotatably mounted in the upper end of the arbor 57, and a universal joint 102 connects the core section of the guide rail 94 with the swivel block 101. The core section of the guide rail 96 is similarly connected by a swivel block 101' and a universal joint 102' with the apex of the conical impeller 54. Telescopic movement of the core sections relative to the tubular sections of the rails 94, 96 and swinging of the rails at their universal connections 97, 98 with the tower and at their universal connections 102, 102' with the rear vehicle unit accommodate not only leaning of the tower on its pivot axis 26 but also pivotal displacement of the front and rear vehicle units relative to each other about the axis of the king pin 37 and about the axis of the coupling sleeve 43.

The embodiments of the invention in which an exclusive property and privilege is claimed are defined as follows:

1. A log straightening mechanism adapted for use with wheeled tree processing apparatus for straightening logs laterally angled to the desired direction of travel, said mechanism comprising:

a support;
a pair of laterally spaced log impelling members rotatably mounted on said support, each of said members including a generally cone-shaped body portion, said body portions defining a generally V-shaped gap therebetween adapted to receive a laterally angled log to straighten the same; first motor means operatively connected to one of said members for rotatably driving the same in a first direction; and
second motor means independent of said first motor means, said second motor means operatively connected to the other of said members for driving the same independent of the drive to said one of said members and in a direction opposite to said first direction whereby laterally angled logs are straightened.

2. A log straightening mechanism according to claim 1 in combination with a wheeled tree processing apparatus, said apparatus comprising:
a wheeled vehicle including front and rear sections pivotally connected together for articulating and oscillating motion therebetween;
tree delimbing and bucking means positioned on said front section; and
said log impelling members positioned on said rear section.

3. A log straightening mechanism according to claim 2 wherein said mechanism further includes a series of circumferentially oriented cleats secured to said body portion of each of log impelling members.

4. A log straightening mechanism according to claim 3 wherein said log impelling members are rotatably mounted on said rear section at opposite sides respectively, of a vertical plane extending lengthwise of said rear section through the pivot center of the pivot point between said front and rear sections.

5. A log straightening mechanism according to claim 4 further comprising a pair of relatively spaced rearwardly converging log guiding baffles mounted on said rear vehicle section in rearwardly spaced relation to said log impelling members, and a log storage means for storing a plurality of logs rearwardly of said baffles.

6. A log straightening mechanism according to claim 5 wherein said delimbing and bucking means is positioned on a tower structure mounted on said front vehicle section for pivotal back and forth adjustment between a vertical position and a leaned position in laterally overhanging relation to said front section, and further comprising means for transferring delimbed logs into said V-shaped gap including a pair of telescopic guide members having upper ends swingably connected with said tower structure, and lower ends swingably connected with said rear vehicle section in overlying relation, respectively, to said log impelling members.

7. A log straightening mechanism according to claim 1 wherein said first and second motor means each include a hydraulic motor adapted to be driven independently of the other hydraulic motor for independently driving the log impelling member connected to each hydraulic motor.

* * * * *